(12) United States Patent
Teixeira et al.

(10) Patent No.: US 11,118,471 B2
(45) Date of Patent: Sep. 14, 2021

(54) VARIABLE AREA VANE ENDWALL TREATMENTS

(71) Applicant: UNITED TECHNOLOGIES CORPORATION, Hartford, CT (US)

(72) Inventors: John D. Teixeira, Palm City, FL (US); Eric A. Grover, Tolland, CT (US); Raymond Surace, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 783 days.

(21) Appl. No.: 15/027,526

(22) PCT Filed: Oct. 20, 2014

(86) PCT No.: PCT/US2014/061333
§ 371 (c)(1),
(2) Date: Apr. 6, 2016

(87) PCT Pub. No.: WO2015/099869
PCT Pub. Date: Jul. 2, 2015

(65) Prior Publication Data
US 2016/0237845 A1     Aug. 18, 2016

Related U.S. Application Data (60) Provisional application No. 61/905,492, filed on Nov. 18, 2013.

(51) Int. Cl.
*F01D 17/16* (2006.01)
*F01D 5/14* (2006.01)

(52) U.S. Cl.
CPC ........... *F01D 17/162* (2013.01); *F01D 5/143* (2013.01); *F05D 2250/241* (2013.01);
(Continued)

(58) Field of Classification Search
CPC .. F01D 17/162; F01D 5/143; F01D 2250/241; F01D 2250/711;
(Continued)

(56) References Cited

U.S. PATENT DOCUMENTS 2,651,496 A * 9/1953 Buckland ................ F01D 9/065
415/135
3,990,810 A * 11/1976 Amos .................... F01D 17/162
415/161

(Continued)

FOREIGN PATENT DOCUMENTS

WO        2005047656 A1     5/2005

OTHER PUBLICATIONS

International Search Report from corresponding PCT/US14/61333.
(Continued)

*Primary Examiner* — Woody A Lee, Jr.
*Assistant Examiner* — Brian Christopher Delrue
(74) *Attorney, Agent, or Firm* — Carlson, Gaskey & Olds, P.C.

(57) ABSTRACT

A gas turbine engine component includes an outer diameter endwall, an inner diameter endwall spaced radially inward of the outer diameter endwall, and at least one body supported between the outer and inner endwalls for rotation about an axis. The body includes an outer diameter surface spaced from the outer diameter endwall by a first gap and an inner diameter surface spaced from the inner diameter endwall by a second gap. The outer and inner diameter surfaces and the outer and inner diameter endwalls are configured such that the first and second gaps remain generally constant in size as the body rotates about the axis.

19 Claims, 4 Drawing Sheets

(52) U.S. Cl.
CPC .. *F05D 2250/711* (2013.01); *F05D 2250/712* (2013.01); *Y02T 50/60* (2013.01)

(58) Field of Classification Search
CPC .. F01D 2250/712; F01D 17/167; F01D 11/14; F01D 7/00; F01D 5/20; Y02T 50/673
USPC ........................................................ 416/160
See application file for complete search history.

(56) References Cited

U.S. PATENT DOCUMENTS

| | | | | |
|---|---|---|---|---|
| 3,992,127 | A * | 11/1976 | Booher, Jr. | ............. F01D 9/042 415/136 |
| 4,013,377 | A * | 3/1977 | Amos | ................... F01D 17/162 415/161 |
| 4,150,915 | A * | 4/1979 | Karstensen | ........... F01D 17/162 251/249.5 |
| 4,278,398 | A * | 7/1981 | Hull | ...................... F01D 17/162 415/160 |
| 4,732,538 | A * | 3/1988 | Wollenweber | .......... F01D 5/084 416/129 |
| 4,863,343 | A | 9/1989 | Smed | |
| 5,517,817 | A | 5/1996 | Hines | |
| 6,183,197 | B1 | 2/2001 | Bunker et al. | |
| 6,602,049 | B2 * | 8/2003 | Caubet | ................... F01D 5/143 415/160 |
| 6,619,916 | B1 | 9/2003 | Capozzi et al. | |
| 6,669,445 | B2 | 12/2003 | Staubach et al. | |
| 6,709,231 | B2 * | 3/2004 | Schipani | ................. F01D 5/143 415/160 |
| 7,581,924 | B2 | 9/2009 | Marini et al. | |
| 7,887,297 | B2 | 2/2011 | Allen-Bradley et al. | |
| 8,105,919 | B2 | 1/2012 | McCaffrey et al. | |
| 8,192,153 | B2 | 6/2012 | Harvey et al. | |
| 8,511,978 | B2 | 8/2013 | Allen-Bradley et al. | |
| 8,668,445 | B2 * | 3/2014 | Crespo | ..................... F01D 9/04 415/160 |
| 9,533,485 | B2 * | 1/2017 | Marshall | ............... F01D 17/162 |
| 9,638,212 | B2 * | 5/2017 | Marshall | ............... F04D 29/544 |
| 9,708,914 | B2 * | 7/2017 | Fulayter | ................ F01D 17/162 |
| 2002/0061249 | A1 * | 5/2002 | Caubet | .................... F01D 5/143 415/160 |
| 2003/0026693 | A1 | 2/2003 | Schipani et al. | |
| 2003/0161724 | A1 | 8/2003 | Capozzi et al. | |
| 2009/0097966 | A1 | 4/2009 | McCaffrey | |
| 2010/0104423 | A1 | 4/2010 | Severin et al. | |
| 2011/0038708 | A1 | 2/2011 | Butkiewicz | |
| 2012/0219401 | A1 | 8/2012 | Rawlinson et al. | |
| 2012/0251291 | A1 | 10/2012 | Ledezma et al. | |
| 2013/0000322 | A1 | 1/2013 | Silkowski | |
| 2013/0031913 | A1 | 2/2013 | Little | |
| 2013/0034435 | A1 | 2/2013 | Propheter-Hinckley | |
| 2013/0108433 | A1 | 5/2013 | Green et al. | |
| 2014/0255188 | A1 * | 9/2014 | Fulayter | ................ F01D 17/162 416/1 |

OTHER PUBLICATIONS

International Preliminary Report on Patentability for International Application No. PCT/US2014/061333 dated Jun. 2, 2016.
Supplementary European Search Report for European Application No. 14875854.3 dated Nov. 4, 2016.

* cited by examiner

VARIABLE AREA VANE ENDWALL TREATMENTS

CROSS-REFERENCE TO RELATED APPLICATION

This application claims priority to U.S. Provisional Application No. 61/905,492, filed 18 Nov. 2013.

STATEMENT REGARDING FEDERALLY SPONSORED RESEARCH OR DEVELOPMENT

This invention was made with government support under Contract No. N00014-09-D-0821-0006, awarded by the United States Navy. The Government has certain rights in this invention.

BACKGROUND OF THE INVENTION

Variable Area Turbines (VATs) are an adaptive component which, when coupled with other adaptive engine features such as adaptive fans, compressors with variable vanes, variable nozzles, etc. can yield significant benefits in overall gas turbine engine performance. Such benefits may include but are not limited to reduced specific fuel consumption (SFC), reduced high pressure compressor discharge air temperature at take-off conditions, improved throttle response, and improved part life.

The VATs function is to provide a change in the turbine flow parameter by changing turbine flow area, for example. Varying turbine flow area may be achieved by rotating a plurality of the individual vane airfoils in a first stage of the turbine. In order to minimize turbine vane performance debits associated with rotating the variable vane airfoil, measures should be taken to minimize the areas of concern. These areas include, for example, varying cooling flow requirements, leakage flow, and variable vane hardware gaps. One of the critical variable vane hardware gaps that should be minimized is the gap between a rotating variable vane endwall and the inner and outer diameter flowpaths. Minimizing this gap will help reduce the amount of hot gas that can pass from the pressure side to the suction side of the vane airfoil, thus improving turbine performance and the durability of the variable vane airfoil itself.

In one example configuration, the variable vane is rotated within a cylindrical inner and outer diameter flowpath. During rotation the variable vane endwall gaps change. When the variable vane airfoil is rotated from a nominal position, the gap between the vane outer diameter endwall edges and the outer diameter flowpath surfaces decreases. To avoid clashing, the variable vane nominal endwall gap at the outer diameter must be increased. However, increasing this gap can result in an increase in the hot gas migration under the vane endwalls from the pressure side to the suction side of the variable vane, reducing turbine performance and airfoil durability.

Further, as the variable vane is rotated from the nominal position the gap between the vane inner diameter endwall edges and the inner diameter flowpath increases. Increasing this gap can also result in an increase in the hot gas migration under the vane endwalls from the pressure side to the suction side of the vane. These adverse effects are even more severe for a vane that rotates within conical inner and/or outer diameter flowpaths.

SUMMARY OF THE INVENTION

In a featured embodiment, a gas turbine engine component comprises an outer diameter endwall, an inner diameter endwall spaced radially inward of the outer diameter endwall, and at least one body supported between the outer and inner endwalls for rotation about an axis. The body includes an outer diameter surface spaced from the outer diameter endwall by a first gap and an inner diameter surface spaced from the inner diameter endwall by a second gap. The outer and inner diameter surfaces and the outer and inner diameter endwalls are configured such that the first and second gaps remain generally constant in size as the body rotates about the axis.

In another embodiment according to the previous embodiment, the outer diameter endwall includes a first contoured portion spaced radially outward from the outer diameter surface. The inner diameter endwall includes a second contoured portion spaced radially inward of the inner diameter surface. The first and second contoured portions have matching profiles.

In another embodiment according to any of the previous embodiments, the matching profiles comprise spherical endwall surfaces.

In another embodiment according to any of the previous embodiments, the outer diameter surface and inner diameter surface comprise spherical surfaces that correspond to the spherical endwall surfaces.

In another embodiment according to any of the previous embodiments, the at least one body comprises a plurality of bodies. The first and second contoured portions comprise localized spherical endwall surfaces for each body.

In another embodiment according to any of the previous embodiments, the at least one body comprises a plurality of bodies. The first and second contoured portions comprise global spherical endwall surfaces for the plurality of bodies.

In another embodiment according to any of the previous embodiments, the matching profiles comprise flat surfaces.

In another embodiment according to any of the previous embodiments, the outer and inner diameter endwalls include a first portion that is upstream of the first and second contoured portions. The outer and inner diameter endwalls include a second portion that is downstream of the first and second contoured portions. The first and second portions comprise one of a substantially cylindrical or conical flow path.

In another embodiment according to any of the previous embodiments, the at least one body includes a first portion fixed to the outer and inner diameter endwalls and a second portion mounted for pivoting movement relative to the first portion. The outer and inner diameter surfaces are formed as part of the second portion of the body. The outer diameter endwall includes a first contoured portion spaced radially outward from the outer diameter surface and the inner diameter endwall includes a second contoured portion spaced radially inward of the inner diameter surface. The first and second contoured portions have matching profiles.

In another embodiment according to any of the previous embodiments, the matching profiles comprise spherical endwall surfaces.

In another embodiment according to any of the previous embodiments, the outer diameter surface and inner diameter surface comprise spherical surfaces that correspond to the spherical endwall surfaces.

In another embodiment according to any of the previous embodiments, the matching profiles comprise flat endwall surfaces.

In another embodiment according to any of the previous embodiments, the outer diameter surface and inner diameter surface comprise flat surfaces that correspond to the flat endwall surfaces.

In another embodiment according to any of the previous embodiments, the at least one body comprises a variable vane.

In another featured embodiment, a gas turbine engine comprises a compressor section, a combustor section downstream of the compressor section, and a turbine section downstream of the combustor section. The turbine section includes at least one variable vane stage having an outer diameter endwall, an inner diameter endwall spaced radially inward of the outer diameter endwall, and at least one variable vane airfoil supported between the outer and inner endwalls for rotation about an axis. The variable vane airfoil includes an outer diameter surface spaced from the outer diameter endwall by a first gap and an inner diameter surface spaced from the inner diameter endwall by a second gap. The outer and inner diameter surfaces and the outer and inner diameter endwalls are configured such that the first and second gaps remain generally constant in size as the variable vane airfoil rotates about the axis.

In another embodiment according to the previous embodiment, the outer diameter endwall includes a first contoured portion spaced radially outward from the outer diameter surface and the inner diameter endwall includes a second contoured portion spaced radially inward of the inner diameter surface. The first and second contoured portions have matching profiles.

In another embodiment according to any of the previous embodiments, the matching profiles comprise spherical endwall surfaces.

In another embodiment according to any of the previous embodiments, the outer diameter surface and inner diameter surface comprise spherical surfaces that correspond to the spherical endwall surfaces.

In another embodiment according to any of the previous embodiments, the matching profiles comprise flat endwall surfaces.

In another embodiment according to any of the previous embodiments, the outer and inner diameter endwalls include a first portion that is upstream of the first and second contoured portions. The outer and inner diameter endwalls include a second portion that is downstream of the first and second contoured portions. The first and second portions comprise one of a substantially cylindrical or conical flow path.

The foregoing features and elements may be combined in any combination without exclusivity, unless expressly indicated otherwise.

These and other features may be best understood from the following drawings and specification.

DETAILED DESCRIPTION

Figure 1:
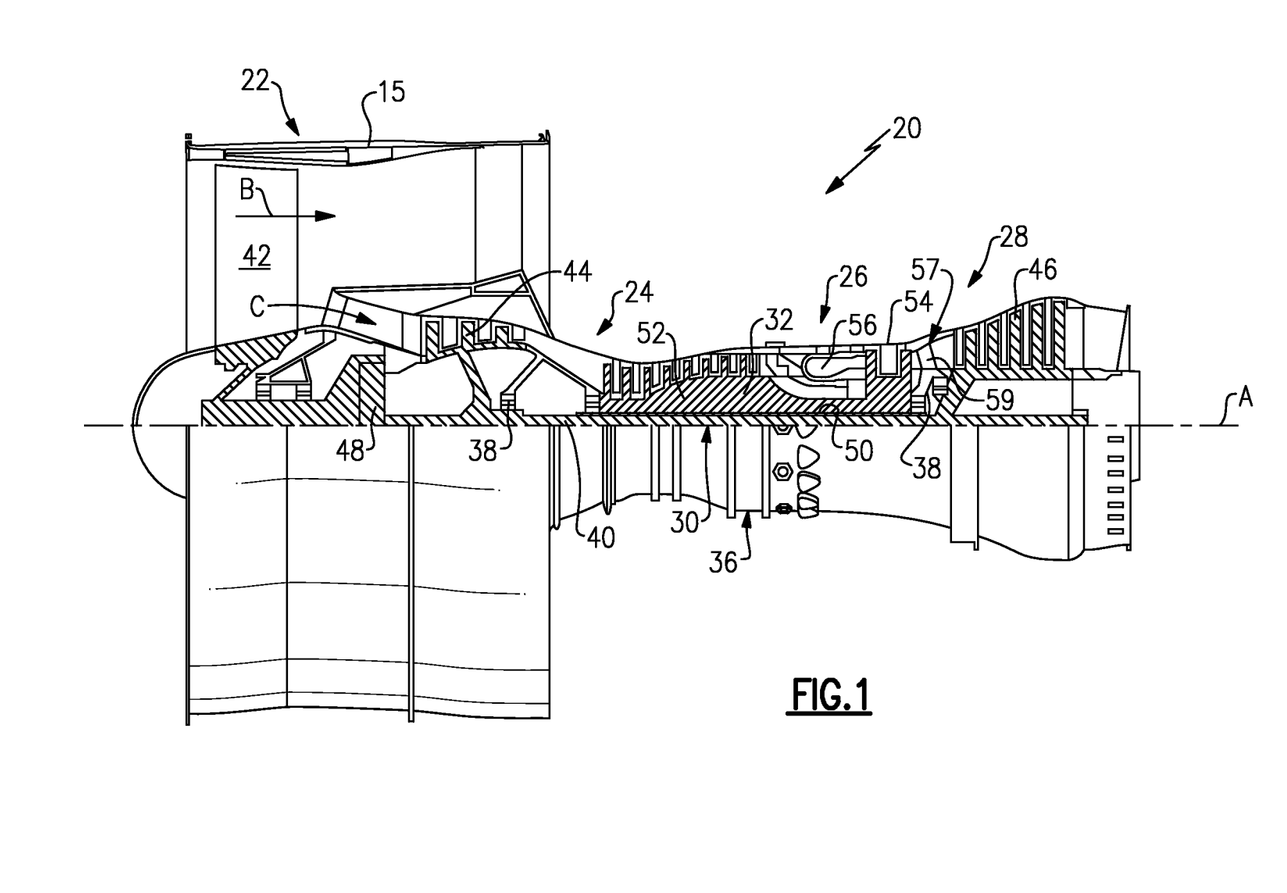
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 due to the work extracted by the turbines. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second.

As shown in FIG. 1, the engine 20 includes stator vane stages or rows distributed through various sections of the engine. In one example, engine 20 is configured to provide a variable area turbine (VAT) to selectively control the flow from the compressor section 24 to the turbine section 28. The VAT provides a change in the turbine flow parameter by changing turbine flow area, for example. Varying turbine flow area is accomplished by rotating a plurality of the individual high pressure 54 and/or low pressure 46 turbine vane airfoils.

The subject invention provides various endwall treatments for pivoting bodies between inner and outer endwalls, such as turbine vanes for example. It should be understood that the teachings discussed below not only apply to the engine configuration discussed above, but also apply to other engine configurations. Other engine example configurations that could utilize the endwall treatments include, but are not limited to, non-geared engines, low bypass engines, turbojets, three-spool configurations, augmented configurations, and configurations with a second bypass stream, etc.

Further, FIGS. 2-7 show various endwall treatments for turbine vanes; however, these end wall treatments could also be used with rotating vanes at other locations within the engine 20. As will be explained in greater detail below, the endwall treatments serve to minimize gaps between a rotating variable vane endwall and the inner and outer diameter flowpaths. This helps to reduce the amount of hot gas that can pass from the pressure side to the suction side of the vane airfoil, thus improving turbine performance and the durability of the variable vane airfoil itself.

Figure 2:
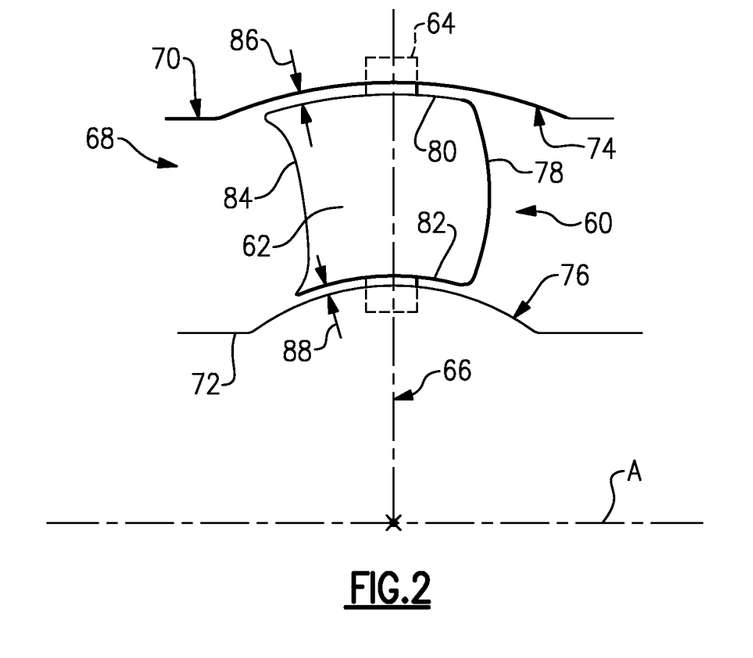
FIG. 2 is a schematic representation of a variable vane with an axisymmetric spherical flowpath.

FIG. 2 shows a configuration with a variable vane 60 having an airfoil 62 supported by a spindle 64 for rotation about an axis 66 defined by the spindle 64. In this example, the axis 66 intersects the engine axis A at a ninety degree angle. The vane 60 rotates within a flowpath 68 defined between an outer diameter endwall 70 and an inner diameter endwall 72. The outer diameter endwall 70 includes an outer diameter contoured portion 74 within which the airfoil 62 rotates. The inner diameter endwall 72 includes an inner diameter contoured portion 76 within which the airfoil 62 rotates. Upstream and downstream of the outer diameter contoured portion 74 and the inner diameter contoured portion 76, the outer diameter endwall 70 and inner diameter endwall 72 are configured to provide a substantially cylindrical or conical flowpath 68.

The airfoil 62 also includes an outer diameter surface 80 and an inner diameter surface 82. The outer diameter 80 and inner diameter 82 surfaces extend between a first edge 84 and an opposite second edge 78 of the airfoil 62. The outer diameter surface 80 is spaced from the outer diameter endwall 70 by a first endwall gap 86 and the inner diameter surface 82 is spaced from the inner diameter endwall 72 by a second endwall gap 88.

As shown in FIG. 2, the outer diameter contoured portion 74 and the inner diameter contoured portion 76 are configured to provide flowpath surfaces that have an axisymmetric spherical topography about a point which is an intersection of axis 66 and the engine centerline. Correspondingly, the outer diameter 80 and inner diameter 82 surfaces of the variable vane 60 also are configured to have spherical topography. This allows the vane 60 to be rotated about its axis 66 without causing interference between the vane 60 and the surfaces of the flowpath 68, achieving constant variable vane endwall gaps 86, 88.

Figure 3:
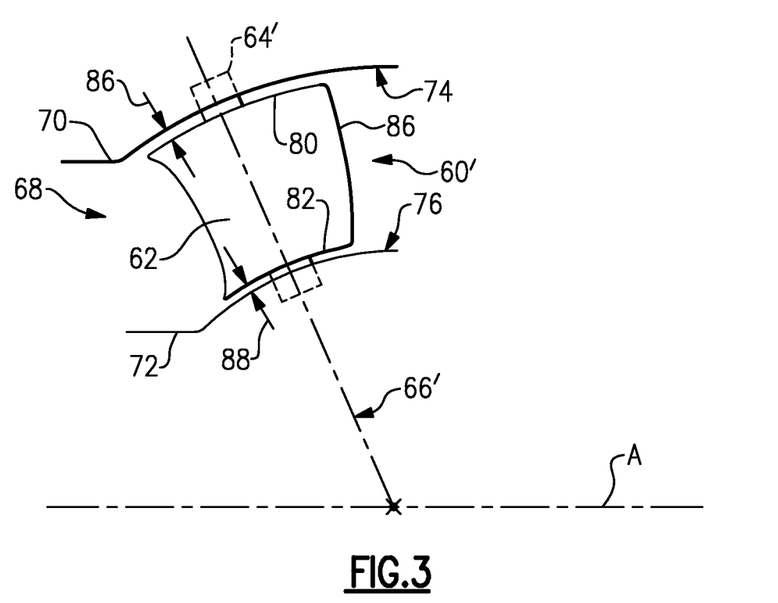
FIG. 3 is a schematic representation of a variable vane with an inclined spindle axis and axisymmetric spherical flowpath.

FIG. 3 shows a configuration similar to FIG. 2 but which has an inclined spindle. In this configuration, the airfoil 62 of the variable vane 60' is supported by a spindle 64' for rotation about an inclined axis 66' defined by the spindle 64'. The inclined axis 66' intersects the engine axis A at an oblique angle. The vane 60' rotates within the flow path 68 defined between the outer 70 and inner 72 diameter endwalls. Upstream and downstream of the outer 74 and inner 76 diameter contoured portions, the outer diameter endwall 70 and inner diameter endwall 72 are configured to provide a substantially cylindrical or conical flow path 68.

The airfoil outer diameter surface 80 is spaced from the outer diameter endwall 70 by the first endwall gap 86 and the airfoil inner diameter surface 82 is spaced from the inner diameter endwall 72 by the second endwall gap 88. In this inclined configuration, the outer diameter contoured portion 74 and the inner diameter contoured portion 76 are configured to provide flow path surfaces that have an axisymmetric spherical topography. Correspondingly, the outer diameter 80 and inner diameter 82 surfaces of the variable vane 60' are also configured to have spherical topography. This allows the vane 60' to be rotated about its axis 66' without causing interference between the vane 60' and the surfaces of the flow path 68, achieving constant variable vane endwall gaps 86, 88.

Figures 4A, 4B, 5:
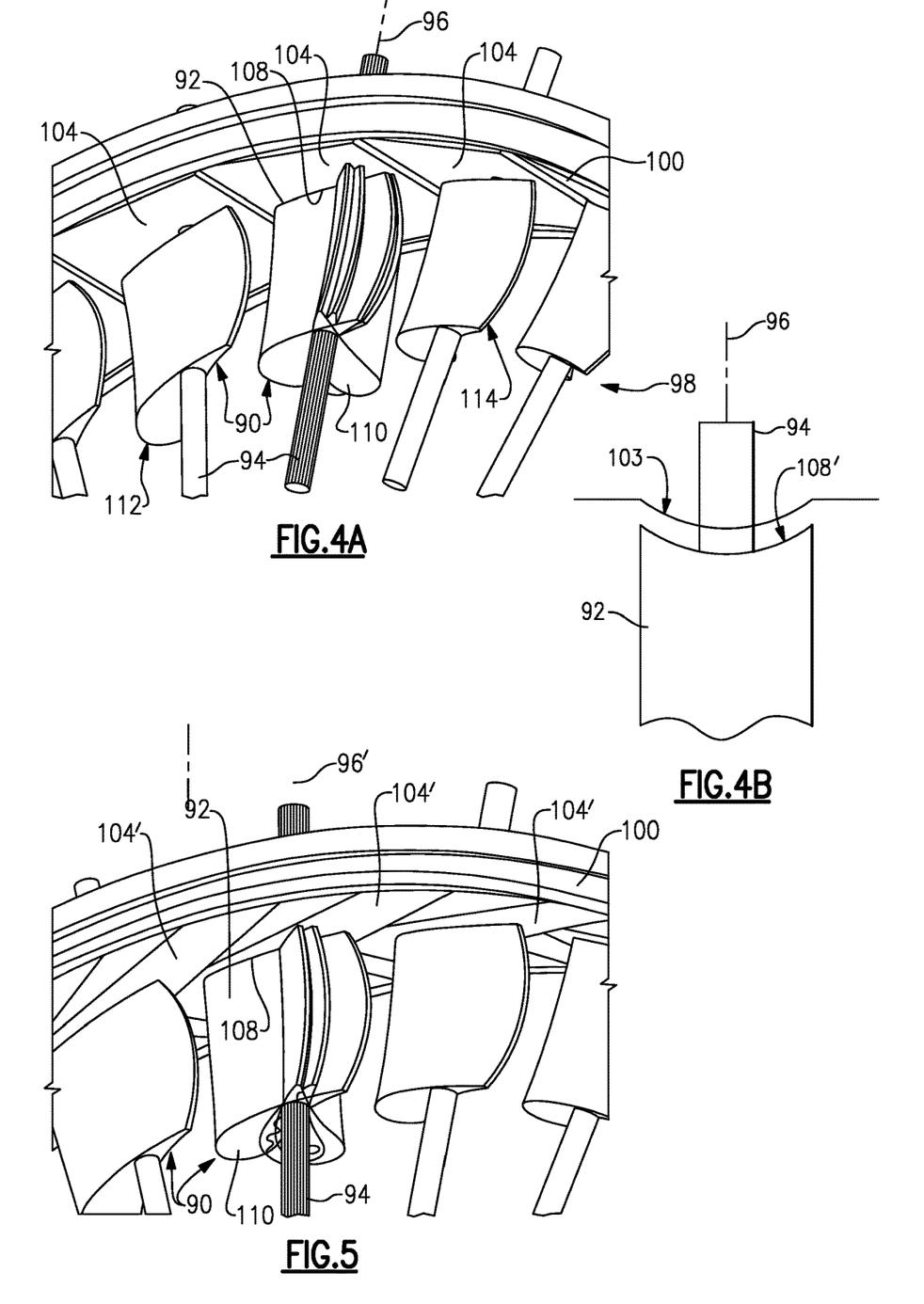
FIG. 4A is a schematic representation of a variable vane with outer diameter local flat endwall profiles using axial boundaries.
FIG. 4B is a schematic representation of a variable vane with outer diameter local spherical endwall profiles using axial boundaries.
FIG. 5 is a schematic representation of a variable vane with local outer diameter flat or alternatively spherical endwall profiles using mid-passage boundaries.

FIG. 4A shows a configuration of a variable vane 90 having local flat outer diameter endwall profiles using axial boundaries. In this configuration the variable vane 90 has an airfoil 92 supported by a spindle 94 for rotation about an axis 96 defined by the spindle 94. The vane 90 rotates within a flow path 98 defined between an outer diameter endwall 100 and an inner diameter endwall (not shown). The outer diameter endwall 100 includes an outer diameter portion 104 which is configured as flat plate portions of the flow path. The inner diameter endwall could be similarly configured. Upstream and downstream of the outer diameter portion 104, the outer diameter endwall 100 and inner diameter endwall are configured to provide a substantially cylindrical or conical flow path 98.

The airfoil 92 also includes an outer diameter surface 108 and an inner diameter surface 110. The outer diameter 108 and inner diameter 110 surfaces extend between a first edge 112 and an opposite second edge 114 of the airfoil 92. The outer diameter surface 108 is spaced from the outer diameter endwall 100 by a gap, and the inner diameter surface 110 is spaced from the inner diameter endwall by a gap similar to that shown in FIGS. 2-3.

As shown in FIG. 4A, the outer diameter portion 104 is configured to provide a generally flat flow path surface at each local location of the airfoil 92. Correspondingly, the outer diameter 108 and inner diameter 110 surfaces of the variable vane 90 are configured to have matching flat surfaces. This allows the vane 90 to be rotated about its axis 96 without causing interference between the vane 90 and the surfaces of the flow path 98, achieving constant variable vane endwall gaps at each individual airfoil location.

FIG. 4B shows a configuration of a variable vane 90, similar to FIG. 4A but having local spherical outer diameter endwall profiles using axial boundaries. In this configuration the variable vane 90 has an airfoil 92 supported by a spindle 94 for rotation about an axis 96 defined by the spindle 94. The vane 90 rotates within a flow path 98 defined between an outer diameter endwall 100 and an inner diameter endwall (not shown). The outer diameter endwall 100 includes an outer diameter portion 103 which is configured as a local spherical portion of the flow path. The inner diameter endwall could be similarly configured. Local spherical endwall profiles are established by spherical geometry with a center point located at any point along the axis of the spindle 96. Upstream and downstream of the outer diameter portion 103, the outer diameter endwall 100 and inner diameter endwall are configured to provide a substantially cylindrical or conical flow path 98.

The airfoil 92 also includes an outer diameter surface 108' and an inner diameter surface 110. The outer diameter 108' and inner diameter 110 surfaces extend between a first edge 112 and an opposite second edge 114 of the airfoil 92. The outer diameter surface 108' is spaced from the outer diameter endwall 100 by a gap, and the inner diameter surface 110 is spaced from the inner diameter endwall by a gap similar to that shown in FIGS. 2-3.

As shown in FIG. 4B, the outer diameter portion 103 is configured to provide a spherical flow path surface at each local location of the airfoil 92. Correspondingly, the outer diameter 108' and inner diameter 110 surfaces of the variable vane 90 are configured to have matching spherical surfaces. This allows the vane 90 to be rotated about its axis 96 without causing interference between the vane 90 and the surfaces of the flow path 98, achieving constant variable vane endwall gaps at each individual airfoil location.

The configuration in FIG. 5 is similar to that of FIG. 4 but the outer diameter portion 104' is configured to have a mid-airfoil passage boundary. In this configuration, only the mean camber portions are flat. In other words, the outer diameter portion 104' provides a flat surface that matches the rotational range of the individual vane 90 at any specific location.

The localized endwall contouring could also use the spherical configuration as show in FIGS. 2-3. In this configuration, the outer diameter contoured portion 74 and the inner diameter contoured portion 76 are configured to provide flow path surfaces that have an axisymmetric spherical topography at each individual vane location. Correspondingly, the outer diameter 80 and inner diameter 82 surfaces of the variable vane 60 are configured to have matching spherical topography at each location.

While the spherical contouring shown in FIGS. 2-3 have a concave outer diameter portion 74 and a convex inner diameter portion 76, employing local spherical endwall treatments enables convex profiles to be used at the outer diameter and/or inner diameter flow paths to minimize the endwall gaps at each vane location (see FIG. 4B). The axis of the spheres used to define the convex local endwall treatments is coincident with the variable vane axis of rotation 96, 96'. The size of the spherical radii can be adjusted independent of the nominal flow path radius, and even independent of that used for adjacent vanes.

Figure 6:
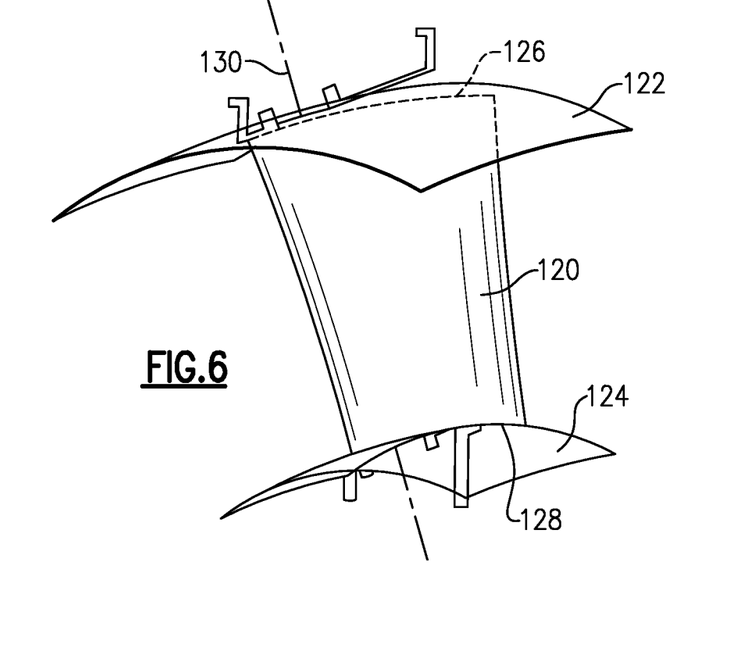
FIG. 6 is a schematic representation of a variable vane with global spherical endwalls.

FIG. 6 shows an example of global spherical endwalls for a variable vane 120. The outer diameter end wall 122 and the inner diameter endwall 124 are configured to each have a spherical surface that is common for all of the vanes in the corresponding stage. Each vane 120 has a corresponding spherical outer diameter surface portion 126 and spherical inner diameter surface portion 128. In the example shown, a spindle axis 130 is perpendicular to a twenty degree parallel conical flow path. The same endwall arrangement can be used with or without a canted spindle.

Global spherical endwalls provide a configuration where a center of the sphere is defined as the point of intersection of the axis of rotation of the variable vane with the engine centerline. Any spherical surface whose center is located at this intersection point will be axis-symmetric to both the variable vane's axis of rotation and the engine centerline. Such a spherical surface would allow a continuous uninterrupted spherical flowpath surface from any single vane to its adjacent vanes around the entire circumference of the vane set, as well as from the leading edge of each vane to its trailing edge. The inner and outer flowpath surfaces as well as each vane's inner and outer endwall surfaces would all consist of concentric spherical surfaces. This is what allows the flowpath surfaces to be continuous between adjacent vanes, as opposed to having unique local spherical surfaces for each vane. In the case of the local spherical surfaces, the center of the spherical surface is located on the axis of rotation of the individual local vane, but is not necessarily coincident with the engine centerline, therefore the local spherical surface can have any radius desired, including having the options of being either convex, concave, or even flat.

Figure 7:
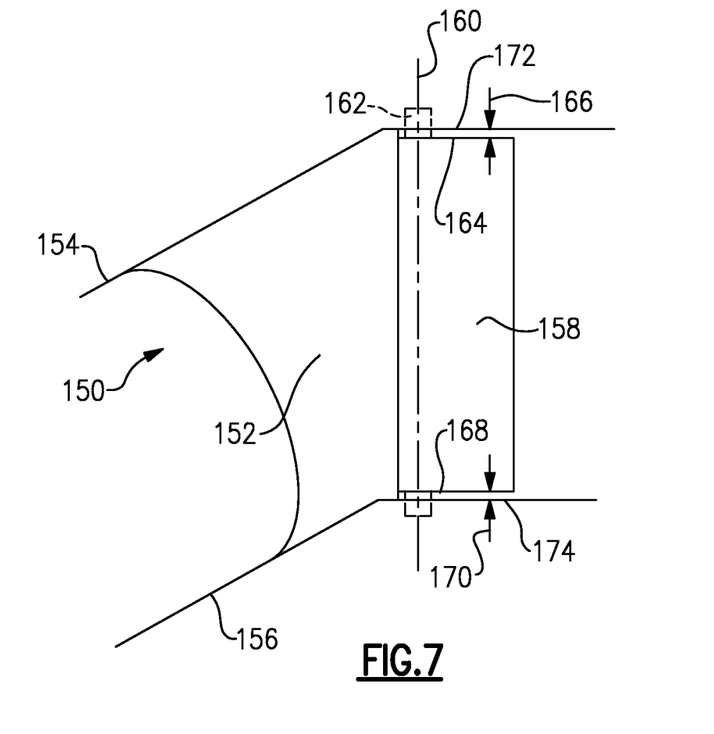
FIG. 7 is a schematic representation of a variable vane having a fixed portion and rotating portion with local flowpath contouring.

FIG. 7 shows an example where a variable vane 150 includes a fixed portion 152 that is fixed to the outer diameter endwall 154 and the inner diameter endwall 156. The variable vane 150 includes pivoting portion 158 that is mounted for pivoting movement relative to the fixed portion 152 about an axis 160. In one example, the pivoting portion 158 comprises a trailing edge flap for the vane 150. A spindle 162 couples the fixed 152 and pivoting 158 portions and defines the rotational axis 160.

The fixed portion 152 is formed as part of, or is separately attached to the outer 154 and inner 156 diameter end walls such that there are no gaps. The pivoting portion 158 has an outer diameter surface 164 that is spaced from the outer diameter endwall 154 by a first gap 166 and an inner diameter surface 168 that is spaced from the inner diameter endwall 156 by a second gap 170. In the example shown, the outer 154 and inner 156 diameter endwalls are locally contoured to include an outer diameter flat portion 172 and an inner diameter flat portion 174 to minimize the gaps 166, 170. During pivoting movement of the portion 158, the gaps 166, 170 remain constant in size. While flat spots are shown, it should be understood that spherical contouring of the pivoting portion of the vane and the corresponding outer and inner diameter endwalls could also be utilized.

Minimizing the gaps between the inner and outer diameter endwalls relative to the inner and outer diameters of the vane will help reduce the amount of hot gas that can pass from the pressure side to the suction side of the vane airfoil, thus improving turbine performance and the durability of the variable vane airfoil itself.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
    an outer diameter endwall radially spaced from an engine centerline;
    an inner diameter endwall spaced radially inward of the outer diameter endwall;
    a plurality of bodies supported between the outer and inner endwalls for rotation about an axis, each body including an outer diameter surface spaced from the outer diameter endwall by a first gap and an inner diameter surface spaced from the inner diameter endwall by a second gap, and wherein the outer and inner diameter surfaces and the outer and inner diameter endwalls are configured such that the first and second gaps remain constant in size as each body rotates about the axis;
    wherein the outer diameter endwall includes a first contoured portion spaced radially outward from the outer diameter surface and the inner diameter endwall includes a second contoured portion spaced radially inward of the inner diameter surface, and wherein the first and second contoured portions have matching profiles that comprise spherical endwall surfaces; and
    wherein the spherical endwall surfaces provide a configuration where a center of a sphere for each spherical endwall surface is defined as a point of intersection of the axis of rotation of the respective body with the engine centerline such that any spherical surface whose center is located at the point of intersection is axis-symmetric to both the axis of rotation of the respective body and the engine centerline to provide a continuous uninterrupted spherical flowpath surface from any single body to corresponding adjacent bodies around an entire circumference of the plurality of bodies, as well as from a leading edge of each body to a trailing edge, or
    wherein the outer and inner diameter surfaces comprise unique local spherical surfaces for each body of the plurality of bodies such that a center of each unique local spherical surface is located on the axis of rotation of each individual body but is not necessarily coincident with the engine centerline.

2. The gas turbine engine component according to claim 1 wherein the outer diameter surface and inner diameter surface comprise spherical surfaces that correspond to the spherical endwall surfaces such that the outer diameter surface and inner diameter surface as well as each body's inner and outer spherical endwall surfaces are comprised of concentric spherical surfaces which allows flowpath surfaces to be continuous between adjacent bodies.

3. The gas turbine engine component according to claim 1 wherein the outer diameter surface and inner diameter surface comprise spherical surfaces that correspond to the spherical endwall surfaces and wherein the first and second contoured portions comprise localized spherical endwall surfaces for each body.

4. The gas turbine engine component according to claim 3 wherein the localized spherical endwall surfaces correspond to localized areas that face the inner and outer diameter surfaces from a trailing edge to a leading edge of each body.

5. The gas turbine engine component according to claim 4 wherein between localized areas, the inner and outer diameter endwalls include contoured portions that are non-spherical.

6. The gas turbine engine component according to claim 1 wherein the outer diameter surface and inner diameter surface comprise spherical surfaces that correspond to the spherical endwall surfaces, and wherein the first and second contoured portions comprise global spherical endwall surfaces for the plurality of bodies, and wherein any spherical surface whose center is located at the point of intersection is axis-symmetric to both the axis about which the respective body rotates and the engine centerline, and wherein the inner and outer diameter surfaces as well as the first and second contoured portions of the inner and outer endwalls all comprise concentric spherical surfaces.

7. The gas turbine engine component according to claim 1 wherein the outer and inner diameter surfaces comprise unique local spherical surfaces for each body of the plurality of bodies such that the center of each unique local spherical surface is located on the axis of rotation of each individual body but is not necessarily coincident with the engine centerline, and wherein the local spherical surface can have any radius desired and can comprise flat surfaces, convex surfaces, or concave surfaces.

8. The gas turbine engine component according to claim 1, wherein the outer and inner diameter endwalls include a first portion that is upstream of the first and second contoured portions, and wherein the outer and inner diameter endwalls include a second portion that is downstream of the first and second contoured portions, and wherein the first and second portions comprise one of a substantially cylindrical or conical flow path.

9. The gas turbine engine component according to claim 1 wherein each body comprises a variable vane.

10. The gas turbine engine component according to claim 1 wherein the axis intersects the engine centerline at an oblique angle.

11. The gas turbine engine component according to claim 1 wherein the axis intersects the engine centerline at an oblique angle to define an inclined axis, and wherein each body comprises an airfoil that is supported by a spindle for rotation about the inclined axis and wherein, immediately upstream of the first and second contoured portions, the outer diameter endwall and inner diameter endwall are configured to provide a cylindrical flowpath that is obliquely orientated to a downstream portion of the cylindrical flowpath defined between the first and second contoured portions.

12. A gas turbine engine comprising:
a compressor section defining an engine centerline;
a combustor section downstream of the compressor section;
a turbine section downstream of the combustor section, the turbine section including at least one variable vane stage having an outer diameter endwall, an inner diameter endwall spaced radially inward of the outer diameter endwall, and at least one variable vane airfoil supported between the outer and inner endwalls for rotation about an axis, the variable vane airfoil including an outer diameter surface spaced from the outer diameter endwall by a first gap and an inner diameter surface spaced from the inner diameter endwall by a second gap, and wherein the outer and inner diameter surfaces and the outer and inner diameter endwalls are configured such that the first and second gaps remain constant in size as the variable vane airfoil rotates about the axis;
wherein the outer diameter endwall includes a first contoured portion spaced radially outward from the outer diameter surface and the inner diameter endwall includes a second contoured portion spaced radially inward of the inner diameter surface, and wherein the first and second contoured portions have matching profiles that comprise spherical endwall surfaces; and
wherein the spherical endwall surfaces provide a configuration where a center of a sphere for the spherical endwall surfaces is defined as a point of intersection of the axis of rotation of the variable vane airfoil with the engine centerline such that any spherical surface whose center is located at the point of intersection is axis-symmetric to both the axis of rotation of the variable vane airfoil and the engine centerline.

13. The gas turbine engine according to claim 12 wherein the outer diameter surface and inner diameter surface comprise spherical surfaces that correspond to the spherical endwall surfaces, and wherein any spherical surface of the variable vane airfoil whose center is located at the point of intersection is axis-symmetric to both the axis of rotation of the variable vane airfoil and the engine centerline, and wherein the inner and outer diameter surfaces as well as the first and second contoured portions of the inner and outer endwalls all comprise concentric spherical surfaces.

14. The gas turbine engine according to claim 12 wherein the outer and inner diameter endwalls include a first portion that is upstream of the first and second contoured portions, and wherein the outer and inner diameter endwalls include a second portion that is downstream of the first and second contoured portions, and wherein the first and second portions comprise one of a substantially cylindrical or conical flow path.

15. The gas turbine engine according to claim 12 wherein the axis of rotation of the variable vane airfoil intersects the engine centerline at an oblique angle.

16. The gas turbine engine according to claim 12 wherein the axis of rotation of the variable vane airfoil is perpendicular to an engine centerline, and wherein the variable vane airfoil incudes a first portion fixed to the outer and inner diameter endwalls and a second portion mounted for pivoting movement relative to the first portion about the axis, and wherein the outer and inner diameter surfaces are formed as part of the second portion.

17. The gas turbine engine according to claim 12 wherein the axis of rotation of the variable vane airfoil intersects the engine centerline at an oblique angle to define an inclined axis and wherein, immediately upstream of the first and second contoured portions, the outer diameter endwall and inner diameter endwall are configured to provide a cylindrical flowpath that is obliquely orientated to a downstream portion of the cylindrical flowpath defined between the first and second contoured portions.

18. A gas turbine engine component comprising:
an outer diameter endwall;
an inner diameter endwall spaced radially inward of the outer diameter endwall;
at least one body supported between the outer and inner endwalls for rotation about an axis that is perpendicular to an engine centerline, the body including an outer diameter surface spaced from the outer diameter endwall by a first gap and an inner diameter surface spaced from the inner diameter endwall by a second gap, and wherein the outer and inner diameter surfaces and the outer and inner diameter endwalls are configured such that the first and second gaps remain constant in size as the body rotates about the axis, and wherein the at least one body incudes a first body portion fixed to the outer and inner diameter endwalls and a second body portion mounted for pivoting movement relative to the first body portion about the axis, and wherein the outer and inner diameter surfaces are formed as part of the second body portion, and wherein the outer diameter endwall includes a first contoured portion spaced radially outward from the outer diameter surface and the inner diameter endwall includes a second contoured portion spaced radially inward of the inner diameter surface, and wherein the first and second contoured portions have matching profiles; and
wherein the first body portion is fixed to a first outer diameter endwall portion and the second body portion pivots relative to a second outer diameter endwall portion that is obliquely orientated relative to the first outer diameter endwall portion.

19. The gas turbine engine component according to claim 18 wherein the first outer diameter endwall portion is spaced radially outwardly of a first inner diameter endwall portion to form a cylindrical flowpath, and wherein the second outer diameter endwall portion is spaced radially outwardly of a second inner diameter endwall portion that is downstream of the first inner diameter endwall portion in the cylindrical flowpath.

* * * * *